United States Patent
Matsumoto et al.

(10) Patent No.: US 12,413,152 B2
(45) Date of Patent: Sep. 9, 2025

(54) SWITCHING CONTROL CIRCUIT AND POWER SUPPLY CIRCUIT

(71) Applicant: FUJI ELECTRIC CO., LTD., Kawasaki (JP)

(72) Inventors: Hiroaki Matsumoto, Matsumoto (JP); Jun Asai, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 209 days.

(21) Appl. No.: 18/455,417

(22) Filed: Aug. 24, 2023

(65) Prior Publication Data
US 2024/0106334 A1   Mar. 28, 2024

(30) Foreign Application Priority Data
Sep. 27, 2022   (JP) .................................. 2022-153812

(51) Int. Cl.
*H02M 3/335*   (2006.01)
*H02M 1/00*    (2006.01)
*H02M 3/00*    (2006.01)

(52) U.S. Cl.
CPC ..... *H02M 3/33569* (2013.01); *H02M 1/0035* (2021.05); *H02M 3/01* (2021.05)

(58) Field of Classification Search
None
See application file for complete search history.

(56) References Cited

U.S. PATENT DOCUMENTS

| | | | |
|---|---|---|---|
| 10,069,403 B1 | 9/2018 | Lim et al. | |
| 10,892,688 B2 | 1/2021 | Chen | |
| 2010/0169176 A1* | 7/2010 | Turakhia | G06Q 30/0256 705/14.54 |
| 2013/0229829 A1* | 9/2013 | Zhang | H02M 3/01 363/16 |
| 2015/0357927 A1* | 12/2015 | Zhang | H02M 3/33571 363/21.02 |
| 2017/0176918 A1 | 6/2017 | Shimura et al. | |
| 2019/0393795 A1* | 12/2019 | Odate | G03G 15/5004 |

(Continued)

FOREIGN PATENT DOCUMENTS

| | | |
|---|---|---|
| JP | 2013-026079 A | 2/2013 |
| JP | 2014-108004 A | 6/2014 |

(Continued)

*Primary Examiner* — Alexander H Taningco
(74) *Attorney, Agent, or Firm* — Rabin & Berdo, P.C.

(57) ABSTRACT

A switching control circuit for a power supply circuit that includes a transformer including primary and secondary coils, and first and second transistors controlling a current flowing through the primary coil. The power supply circuit generates an output voltage at a target level. The switching control circuit controls switching of the first and second transistors. The switching control circuit includes: a drive signal output circuit configured to output drive signals according to a normal mode, when the output voltage is lower than a first level, and output the drive signals according to a burst mode, when the output voltage is higher than the first level; and a driver circuit configured to switch the first and second transistors in response to the drive signals. The drive signal output circuit reduces a first time period in the burst mode, in response to the output voltage rising above the first level.

9 Claims, 13 Drawing Sheets

(56) References Cited

U.S. PATENT DOCUMENTS

| | | |
|---|---|---|
| 2020/0169176 A1 | 5/2020 | Murata et al. |
| 2020/0266704 A1* | 8/2020 | Chen ........................ H02M 3/01 |
| 2021/0111631 A1* | 4/2021 | Kobayashi .......... H02M 1/0035 |
| 2021/0184585 A1* | 6/2021 | Matsumoto ........ H02M 3/33569 |
| 2022/0149741 A1* | 5/2022 | Chen ....................... G01K 3/005 |
| 2022/0173650 A1* | 6/2022 | Araumi ............... H02M 1/0009 |

FOREIGN PATENT DOCUMENTS

| | | |
|---|---|---|
| JP | 2017-112798 A | 6/2017 |
| JP | 6787505 B2 | 11/2020 |
| JP | 2021-093813 A | 6/2021 |
| JP | 2021-093814 A | 6/2021 |
| WO | 2019/155733 A1 | 8/2019 |

* cited by examiner

| OPERATION MODE | VOLTAGE TO DETERMINE SWITCHING CYCLE Tsw | VOLTAGE TO DETERMINE SWITCHING PERIOD T1 |
|---|---|---|
| NORMAL MODE M1 | Vfb, Vc0 | — |
| BURST MODE M2 (VARIABLE SWITCHING PERIOD T1) | Vfb, Vc0 (SAME AS IN NORMAL MODE M1) | Vfb |
| BURST MODE M2 (FIXED SWITCHING PERIOD T1) | Vfb, Vc0 (SAME AS IN NORMAL MODE M1) | — |
| BURST MODE M3 | Vw, Vin | Vfb |

FIG. 5

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2022-153812 filed on Sep. 27, 2022, the entire disclosure of which is hereby incorporated by reference herein.

BACKGROUND

Technical Field

The present disclosure relates to a switching control circuit and a power supply circuit.

Description of the Related Art

Power supply circuits generating an output voltage at a target level from an input voltage have been disclosed (for example, Japanese Patent No. 6787505, WO2019/155733, Japanese Patent Application Publication Nos. 2013-26079, 2014-108004, 2017-112798, 2021-93813, and 2021-93814, and U.S. patent Ser. No. 10/069,403).

When a load of a power supply circuit enters a light condition, a control circuit of the power supply circuit may switch transistors in a burst mode from a normal mode. In this event, the operation of the power supply circuit may become unstable when a method of switching the transistors in the normal mode is different from a method of switching the transistors in the burst mode.

SUMMARY

A first aspect of an embodiment of the present disclosure is a switching control circuit for a power supply circuit that includes a transformer including a primary coil and a secondary coil, and first and second transistors configured to control a current flowing through the primary coil, the power supply circuit being configured to generate an output voltage at a target level, the switching control circuit configured to control switching of the first and second transistors, the switching control circuit comprising: a drive signal output circuit configured to output drive signals according to a normal mode, when the output voltage is lower than a first level, and output the drive signals according to a first burst mode, when the output voltage is higher than the first level; and a driver circuit configured to switch the first and second transistors in response to the drive signals, wherein the normal mode is a mode in which the first and second transistors are continuously switched, in a first cycle based on a feedback voltage corresponding to the output voltage, the first burst mode is a mode in which a first time period, during which the first and second transistors are continuously switched in the first cycle, and a second time period, during which the switching of the first and second transistors is stopped, are repeated in a predetermined cycle, and the drive signal output circuit reduces the first time period in the predetermined cycle, in response to the output voltage rising above the first level.

A second aspect of an embodiment of the present disclosure is a power supply circuit configured to generate an output voltage at a target level, the power supply circuit comprising: a transformer including a primary coil and a secondary coil; first and second transistors configured to control a current flowing through the primary coil; and a switching control circuit configured to control switching of the first and second transistors, wherein the switching control circuit includes: a drive signal output circuit configured to output drive signals according to a normal mode, when the output voltage is lower than a first level, and output the drive signals according to a first burst mode, when the output voltage is higher than the first level, and a driver circuit configured to switch the first and second transistors, in response to the drive signals, wherein the normal mode is a mode in which the first and second transistors are continuously switched, in a first cycle based on a feedback voltage corresponding to the output voltage, and the first burst mode is a mode in which a first time period, during which the first and second transistors are continuously switched in the first cycle, and a second time period, during which the switching of the first and second transistors is stopped, are repeated in a predetermined cycle; and the drive signal output circuit reduces the first time period in the predetermined cycle, in response to the output voltage rising above the first level.

BRIEF DESCRIPTION OF THE DRAWINGS

FIG. 5 is a chart for explaining a relationship between operation modes of a digital control circuit 150 and various voltages.

DETAILED DESCRIPTION

Figure 1:
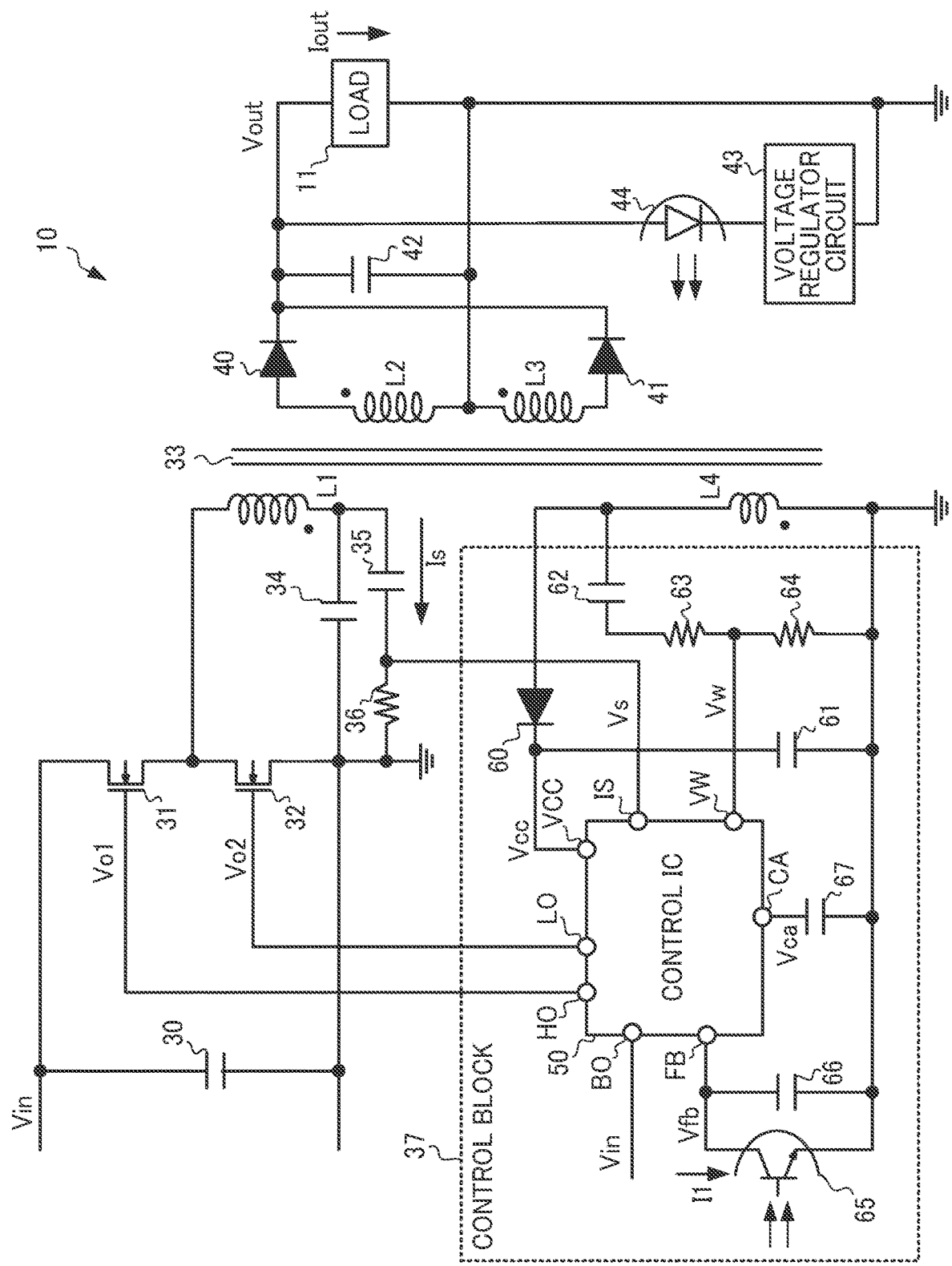
FIG. 1 is a diagram illustrating an example of a DC-DC converter 10.

At least following matters will become apparent from the descriptions of the present specification and the accompanying drawings.

Herein, the same or equivalent constituent elements, members and the like illustrated in the drawings are given the same reference signs, and redundant description thereof is omitted for convenience. In an embodiment of the present disclosure, the term "couple" means to electrically couple unless otherwise noted. Thus, "coupling" includes a case where two components are coupled not only through wiring but also through a resistor, for example.

Embodiment

<<<Overview of DC-DC Converter 10>>>

FIG. 1 is a diagram illustrating an example of a DC-DC converter 10. The DC-DC converter 10 is an LLC current resonant power supply circuit to generate an output voltage Vout at a target level (e.g., 12 V) from a predetermined input voltage Vin (e.g., 400 V).

The DC-DC converter 10 also applies the output voltage Vout to a load 11. Here, it is assumed that the load 11 is an LED of a lighting device (not illustrated), for example, and a current flowing through the load 11 is a load current Iout.

The DC-DC converter 10 includes capacitors 30, 34, 35, and 42, N-channel metal-oxide-semiconductor (NMOS) transistors 31 and 32, a transformer 33, a resistor 36, a control block 37, diodes 40 and 41, a voltage regulator circuit 43, and a light-emitting diode 44.

The capacitor 30 stabilizes a voltage between a power supply line to receive the input voltage Vin and a ground line on the ground side, to remove noise and the like.

The NMOS transistor 31 is a high-side power transistor, and the NMOS transistor 32 is a low-side power transistor. The NMOS transistors 31 and 32 are used as switching devices in an embodiment of the present disclosure, however, for example, P-channel metal-oxide-semiconductor (PMOS) transistors or bipolar transistors may be used.

The transformer 33 includes a primary coil L1, secondary coils L2 and L3, and an auxiliary coil L4. The primary coil L1, the secondary coils L2 and L3, and the auxiliary coil L4 are insulated from one another. In the transformer 33, voltages are generated at the secondary coils L2 and L3 on the secondary side according to changes in voltage across the primary coil L1 on the primary side, and a voltage is generated at the auxiliary coil L4 on the primary side according to changes in voltage of the secondary coils L2 and L3.

The primary coil L1 has one end coupled to a source of the NMOS transistor 31 and a drain of the NMOS transistor 32, and the other end coupled to a source of the NMOS transistor 32 through the capacitor 34. Accordingly, in response to switching of the NMOS transistors 31 and 32 being started, the voltages at the secondary coils L2 and L3 and the auxiliary coil L4 change.

In an embodiment of the present disclosure, the primary coil L1 and the secondary coils L2 and L3 are electromagnetically coupled with the opposite polarities, and the secondary coils L2 and L3 and the auxiliary coil L4 are electromagnetically coupled with the opposite polarities. The polarities of the electromagnetic coupling of the primary coil L1, the secondary coils L2 and L3, and the auxiliary coil L4 of the transformer 33 are not limited to the above.

The capacitor 34 is a so-called resonant capacitor configuring a resonant circuit, with the primary coil L1 of the transformer 33 and a leakage inductance. Note that, in FIG. 1, illustration of the leakage inductance is omitted.

The capacitor 35 and the resistor 36 coupled in series with the capacitor 35 are circuits coupled in parallel with the capacitor 34 to shunt a resonant current of the resonant circuit. In an embodiment of the present disclosure, a current Is obtained by shunting the resonant current flows through the capacitor 35 and the resistor 36, thereby generating a voltage Vs corresponding to the resonant current at a coupling node between the capacitor 35 and the resistor 36.

It is assumed in an embodiment of the present disclosure that a direction of a current flowing from the primary coil L1 to the capacitor 34 is a "positive direction", and a direction of a current flowing from the capacitor 34 to the primary coil L1 is a "negative direction".

The control block 37 is a circuit block to control switching of the NMOS transistors 31 and 32, and will be described later in detail.

The diodes 40 and 41 rectify the voltages at the secondary coils L2 and L3, and the capacitor 42 smooths the rectified voltage. As a result, the smoothed output voltage Vout is generated at the capacitor 42. Note that the output voltage Vout reaches a direct-current voltage (DC) voltage at a target level (e.g., 12 V).

The voltage regulator circuit 43 generates a constant DC voltage, and is configured using a shunt regulator, for example.

The light-emitting diode 44 is a device to emit light having an intensity corresponding to a difference between the output voltage Vout and an output of the voltage regulator circuit 43, to configure a photocoupler together with a phototransistor 65, which will be described later. In an embodiment of the present disclosure, the intensity of the light from the light-emitting diode 44 increases as the level of the output voltage Vout rises.

===Control Block 37===

The control block 37 includes a control IC 50, a diode 60, capacitors 61, 62, 66, and 67, resistors 63 and 64, and a phototransistor 65.

The control IC 50 is an integrated circuit to control switching of the NMOS transistors 31 and 32, and has terminals VCC, BO, FB, VW, FB, IS, CA, HO, and LO. The control IC 50 has a ground terminal to receive a ground voltage, and the like, for example, which are omitted here for convenience.

The terminal VCC is a terminal to receive a voltage Vcc to operate the control IC 50. A cathode of the diode 60 and the capacitor 61 having one end that is grounded are coupled to the terminal VCC. The auxiliary coil L4 is coupled to an anode of the diode 60. In an embodiment of the present disclosure, when the control IC 50 starts switching the NMOS transistors 31 and 32, a voltage corresponding to the load current Iout is generated at the auxiliary coil L4.

As a result, the capacitor 61 is charged with the current from the diode 60, and the charge voltage of the capacitor 61 results in a power supply voltage Vcc to operate the control IC 50. Note that the control IC 50 is started up based on a predetermined voltage (e.g., alternating current (AC) voltage from a commercial power supply) applied to a terminal not illustrated, and then operates based on the power supply voltage Vcc.

The terminal VW is a terminal to detect the voltage at the auxiliary coil L4. In an embodiment of the present disclosure, the capacitor 62 and resistors 63 and 64 that are coupled in series are coupled in parallel with the auxiliary coil L4. The capacitor 62 is an element allowing an AC component of the voltage from the auxiliary coil L4 to pass therethrough.

The resistors 63 and 64 configure a voltage divider circuit to divide the AC component of the voltage generated at the auxiliary coil L4. In an embodiment of the present disclosure, a node at which the resistors 63 and 64 are coupled is coupled to the terminal VW, and the voltage at the terminal VW results in a voltage Vw.

The terminal BO is a terminal to receive the input voltage Vin of the DC-DC converter 10.

The terminal FB is a terminal at which a feedback voltage Vfb corresponding to the output voltage Vout is generated, and to which the phototransistor 65 and the capacitor 66 are coupled. The phototransistor 65 passes a bias current I1 corresponding to the intensity of the light from the light-emitting diode 44, from the terminal FB to the ground. The capacitor 66 is provided to remove noise between the terminal FB and the ground. Accordingly, the phototransistor 65 operates as a transistor to generate a sink current.

The terminal IS is a terminal to receive a voltage corresponding to the resonant current of the DC-DC converter 10. As described above, the voltage Vs corresponding to the current Is is obtained by shunting the resonant current is generated at the node at which the capacitor 35 and the resistor 36 are coupled. In an embodiment of the present disclosure, the node at which the capacitor 35 and the resistor 36 are coupled is coupled to the terminal IS, and thus the voltage Vs is applied to the terminal IS.

The input voltage Vin is received through the terminal BO and detected inside the control IC 50. This is because power corresponding to the resonant current and the current Is (e.g., power of the load 11) is proportional to the input voltage Vin even when the resonant current and the current Is have the same magnitude.

Through the terminal CA, a voltage Vca, which varies with the voltage Vs at the terminal IS and indicates power consumed by the load 11, is applied to the capacitor 67.

The terminal HO is a terminal through which a signal Vo1 to drive the NMOS transistor 31 is outputted, and to which a gate of the NMOS transistor 31 is coupled.

The terminal LO is a terminal through which a signal Vo2 to drive the NMOS transistor 32 is outputted, and to which a gate of the NMOS transistor 32 is coupled.

The control IC 50 corresponds to a "switching control circuit", the capacitor 34 corresponds to a "first capacitor", and the auxiliary coil L4 corresponds to an "auxiliary coil". The NMOS transistor 31 corresponds to a "first transistor" and the NMOS transistor 32 corresponds to a "second transistor". The terminal VW corresponds to a "first terminal" and the terminal BO corresponds to a "second terminal".

<<<Details of Control IC 50>>>

Figure 2:
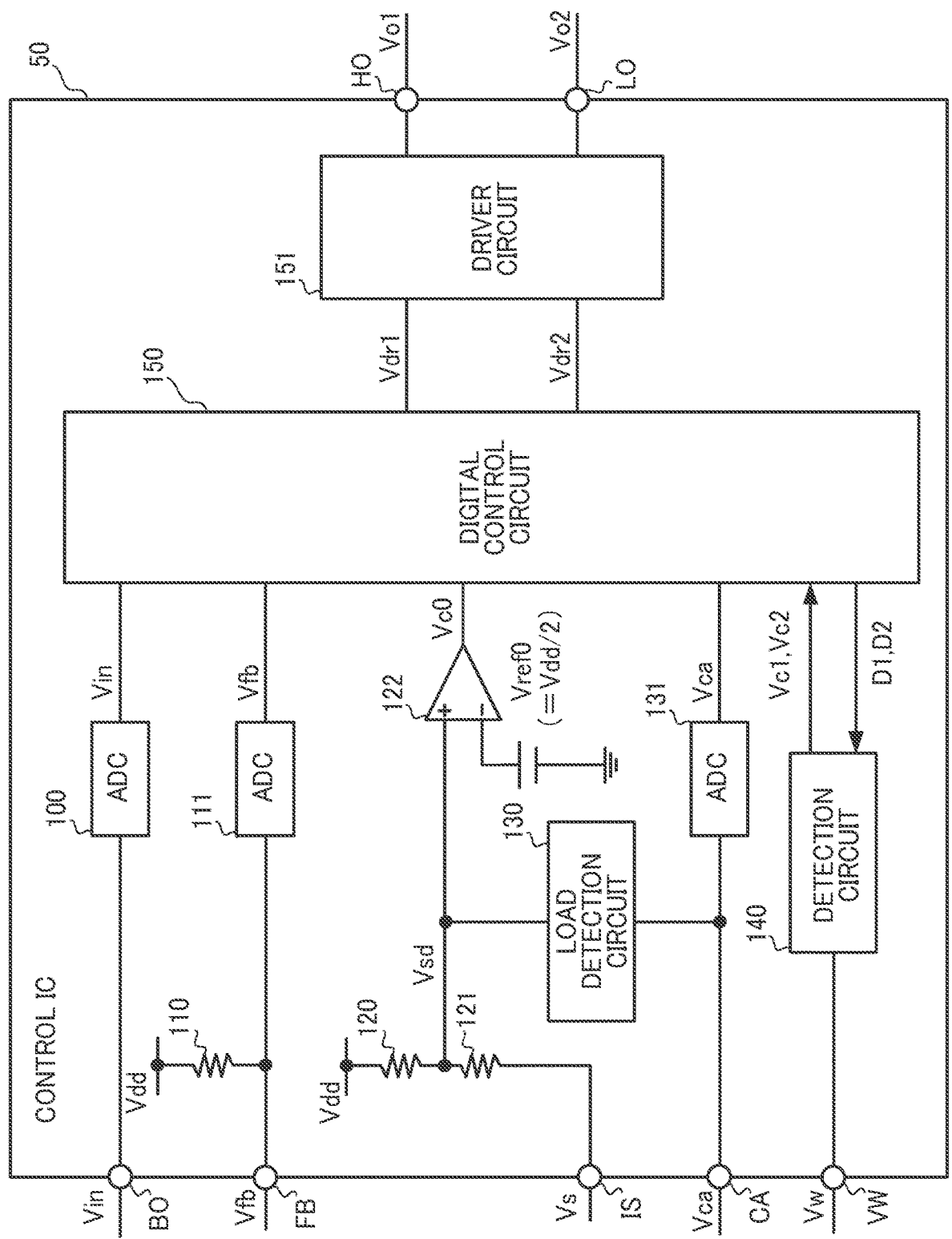
FIG. 2 is a diagram illustrating an example of a control IC 50.

FIG. 2 is a diagram illustrating a configuration example of the control IC 50. The control IC 50 includes analog-to-digital (AD) converters (ADCs) 100, 111, and 131, resistors 110, 120, and 121, a comparator 122, a load detection circuit 130, a detection circuit 140, a digital control circuit 150, and a driver circuit 151.

===AD Converter 100===

The AD converter 100 converts the input voltage Vin applied to the terminal BO into a digital value, to thereby output a resultant voltage. In FIG. 2, voltages converted into digital values are also illustrated in the same manner as analog voltages before conversion.

===Resistor 110 and AD Converter 111===

The resistor 110 is an element to generate, at the terminal FB, the feedback voltage Vfb corresponding to the bias current I1 in FIG. 1. The resistor 110 has one end to receive a power supply voltage Vdd and the other end coupled to the terminal FB.

In an embodiment of the present disclosure, in response to the output voltage Vout exceeding the target level, the intensity of the light from the light-emitting diode 44 increases and the bias current I1 increases, and thus the feedback voltage Vfb drops. Meanwhile, in response to the output voltage Vout drops below the target level, the intensity of the light from the light-emitting diode 44 decreases and the bias current I1 decreases, and thus the feedback voltage Vfb rises.

The feedback voltage Vfb is expressed by the following equation (1):

$$Vfb = Vdd - R \times I1 \qquad (1),$$

where R is a resistance value of the resistor 110.

The AD converter 111 converts the feedback voltage Vfb generated at the terminal FB into a digital value, to thereby output a resultant voltage.

===Resistors 120 and 121 and Comparator 122===

The resistors 120 and 121 are so-called level shifter circuits configured to shift the center level of the voltage Vs that changes around the ground voltage (i.e., 0 V). The resistors 120 and 121 of an embodiment of the present disclosure both have the same resistance value. The power supply voltage Vdd is applied to the resistor 120 of the resistors 120 and 121, which are coupled in series, and the resistor 121 is coupled to the terminal IS.

Accordingly, the resistor 121 is coupled, through the terminal IS, to the coupling node between the capacitor 35 and the resistor 36 in FIG. 1. Here, when the current Is flowing through the resistor 36 is zero, the voltage Vs is zero. Accordingly, in this case, the level of the voltage Vsd at the node at which the resistors 120 and 121 in FIG. 2 are coupled results in Vdd/2.

In response to the current Is flowing in the positive direction, the voltage Vs also results in a positive voltage, and thus the voltage Vsd rises from Vdd/2. Meanwhile, in response to the current Is flowing in the negative direction, the voltage Vs also results in a negative voltage, and thus the voltage Vsd drops from Vdd/2. Accordingly, the voltage Vsd in an embodiment of the present disclosure changes around the level of Vdd/2, according to the direction of the current Is and the magnitude of the current Is.

The comparator 122 is a circuit configured to detect the direction of the current Is, based on the voltage Vsd and a predetermined reference voltage Vref0. In an embodiment of the present disclosure, since the level of the reference voltage Vref0 is Vdd/2, the comparator 122 outputs a voltage Vc0 at a high level (hereinafter, referred to as high or high level) when the current Is is in the positive direction, and outputs a voltage Vc0 at a low level (hereinafter, referred to as low or low level) when the current Is is in the negative direction.

Accordingly, the resistors 120 and 121 and the comparator 122 of an embodiment of the present disclosure operate as a circuit to detect the direction in which the current Is flows.

===Load Detection Circuit 130===

The load detection circuit 130 is a circuit to detect a condition of the load 11 (here, power consumption of the load 11). To be more specific, the load detection circuit 130 outputs the voltage Vca corresponding to the power of the load 11 to the terminal CA to which the capacitor 67 is coupled, based on the voltage Vsd corresponding to the current Is (i.e., the resonant current).

The AD converter 131 converts the voltage Vca generated at the terminal CA into a digital value, to thereby output a resultant voltage. Note that the voltage Vca increases with an increase in the power consumption of the load 11 and an increase in the current Is, for example. Thus, the digital control circuit 150, which will be described later, can determine the power consumption of the load 11, based on the voltage Vca. Note that the power corresponding to the resonant current and the current Is (e.g., the power of the load 11) is proportional to the input voltage Vin as described above. Thus, a process of correcting the voltage Vca may be performed using the AD-converted input voltage Vin.

===Detection Circuit 140===

Figure 3:
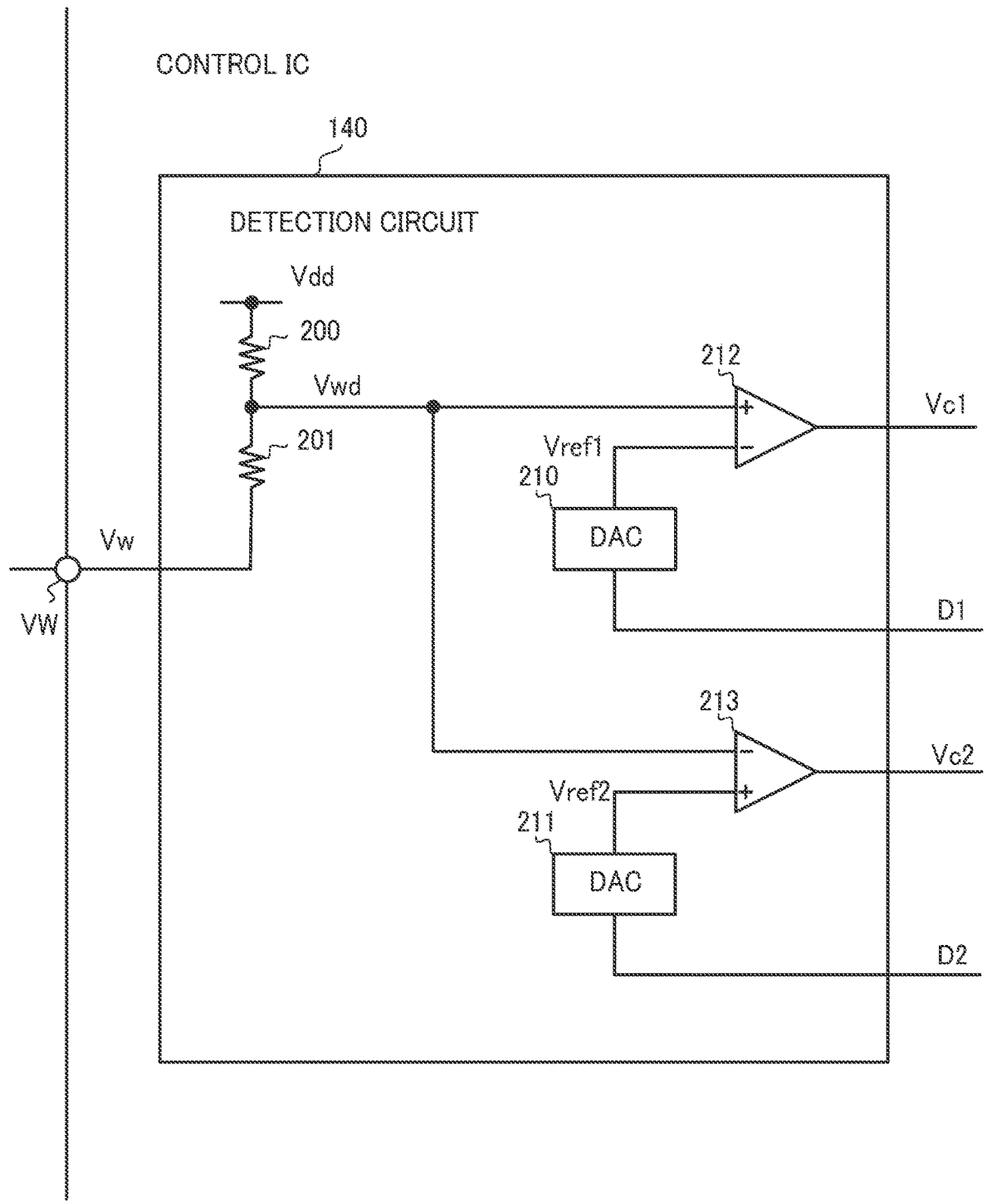
FIG. 3 is a diagram illustrating an example of a detection circuit 140.

The detection circuit 140 is a circuit to detect the timing at which the DC-DC converter 10 is operated in a predetermined burst mode (described later), based on the voltage Vw. FIG. 3 is a diagram illustrating an example of the detection circuit 140. The detection circuit 140 includes resistors 200 and 201, digital-to-analog (DA) converters (DACs) 210 and 211, and comparators 212 and 213.

The resistors 200 and 201 correspond to level shifter circuits configured to shift the center level of the voltage Vw applied to the terminal VW in FIG. 1. In an embodiment of the present disclosure, it is assumed that a voltage Vwd is a voltage generated at the node at which the resistors 200 and 201 are coupled by shifting the level of the voltage Vw.

Figure 4:
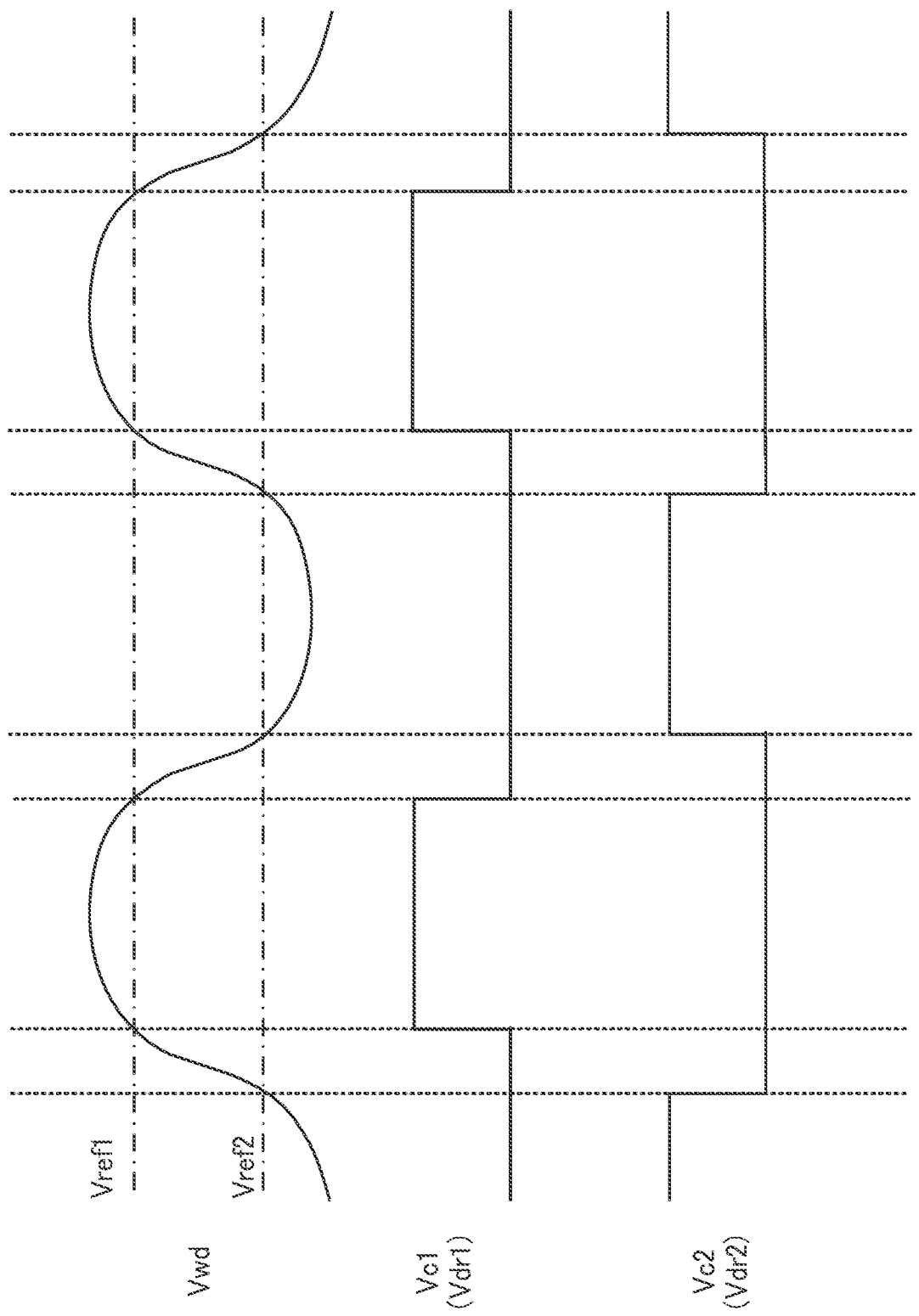
FIG. 4 is a chart illustrating an example of voltages Vwd, Vc1, and Vc2.

Here, the voltage at the node at which the auxiliary coil L4 and the capacitor 62 are coupled changes in the positive and negative directions with 0 V as the reference voltage, in response to the NMOS transistors 31 and 32 being switched. As a result, the voltage Vwd obtained by level-shifting the voltage Vw has an AC waveform as illustrated in the upper part of FIG. 4, for example.

The DA converter 210 outputs a reference voltage Vref1 at a level corresponding to data D1 from the digital control circuit 150 which will be described later. The DA converter 211 outputs a reference voltage Vref2 at a level corresponding to data D2.

The voltage across the auxiliary coil L4 changes according to the level of the input voltage Vin. To be more specific, as the level of the input voltage Vin rises, a change in the voltage across the auxiliary coil L4 also increases. As a result, an amplitude of the voltage Vwd during switching of the NMOS transistors 31 and 32 also increases.

The digital control circuit 150 of an embodiment of the present disclosure adjusts the levels of the reference voltages Vref1 and Vref2 according to the level of the input voltage Vin. Here, in response to the level of the input voltage Vin rising, the digital control circuit 150 outputs data D1 and D2 such that the level of the reference voltage Vref1 rises and the level of the reference voltage Vref2 drops. As a result, the reference voltages Vref1 and Vref2 are adjusted such that the difference in level between the reference voltages Vref1 and Vref2 increases.

Meanwhile, in response to the level of the input voltage Vin dropping, the digital control circuit 150 outputs data D1 and D2 such that the level of the reference voltage Vref1 drops and the level of the reference voltage Vref2 rises. As a result, the reference voltages Vref1 and Vref2 are adjusted such that the difference in level between the reference voltages Vref1 and Vref2 decreases.

The comparator 212 compares the voltage Vwd and the reference voltage Vref1, to thereby output a voltage Vc1 indicating a result of comparison. To be more specific, the comparator 212 outputs a high voltage Vc1, in response to the voltage Vwd exceeding the reference voltage Vref1, and outputs a low voltage Vc1, in response to the voltage Vwd dropping below the reference voltage Vref1.

The comparator 213 compares the voltage Vwd and the reference voltage Vref2, to thereby output a voltage Vc2 indicating a result of comparison. To be more specific, the comparator 213 outputs a low voltage Vc2, in response to the voltage Vwd exceeding the reference voltage Vref2, and outputs a high voltage Vc2, in response to the voltage Vwd dropping below the reference voltage Vref2.

Although details will be described later, the digital control circuit 150 outputs high drive signals Vdr1 and Vdr2 to turn on the NMOS transistors 31 and 32, in response to the voltages Vc1 and Vc2 going high, respectively, in a predetermined burst mode M3 (described later).

===Digital Control Circuit 150===

The digital control circuit 150 in FIG. 2 outputs the drive signals Vdr1 and Vdr2 according to the operation mode of the DC-DC converter 10, based on various voltages inputted thereto. The digital control circuit 150 includes, for example, a digital signal processing circuit (DSP) not illustrated and a storage circuit (e.g., memory).

Although details will be described later, as illustrated in FIG. 5, the digital control circuit 150 outputs the drive signals Vdr1 and Vdr2 according to three operation modes, which are a normal mode M1, a burst mode M2, and the burst mode M3, to thereby operate the DC-DC converter 10.

Hereinafter, in an embodiment of the present disclosure, a state in which the digital control circuit 150 outputs the drive signals Vdr1 and Vdr2 according to the predetermined operation mode may be referred to as "the digital control circuit 150 operates in the predetermined operation mode". Moreover, when the digital control circuit 150 operates in the predetermined operation mode, the DC-DC converter 10 also operates in the predetermined operation mode.

Here, the "normal mode" is an operation mode in which the control IC 50 continuously switches the NMOS transistors 31 and 32. The "burst mode" is an operation mode in which the control IC 50 intermittently switches the NMOS transistors 31 and 32. Thus, in the "burst mode", a switching period (hereinafter referred to as a switching period T1) during which the NMOS transistors 31 and 32 are switched and a stop period (hereinafter referred to as a stop period T2) during which the switching of the NMOS transistors 31 and 32 is stopped are repeated.

As illustrated in FIG. 5, the digital control circuit 150 uses the feedback voltage Vfb and the voltage Vc0 indicating the direction of the current Is, when operating in the normal mode M1 or the burst mode M2. Further, the digital control circuit 150 uses the feedback voltage Vfb, the voltage Vw, and the input voltage Vin, when operating in the burst mode M3. The operation modes of the digital control circuit 150 will be described later in detail.

The digital control circuit 150 configured to output the drive signals Vdr1 and Vdr2 corresponds to a "drive signal output circuit".

===Driver Circuit 151===

The driver circuit 151 is a buffer circuit configured to switch the NMOS transistors 31 and 32 in response to the drive signals Vdr1 and Vdr2. To be more specific, the driver circuit 151 drives the NMOS transistor 31 using a signal Vo1 having the same logic level as that of the drive signal Vdr1, and drives the NMOS transistor 32 using a signal Vo2 having the same logic level as that of the drive signal Vdr2.

<<<Operation of Digital Control Circuit 150>>>

Figure 6:
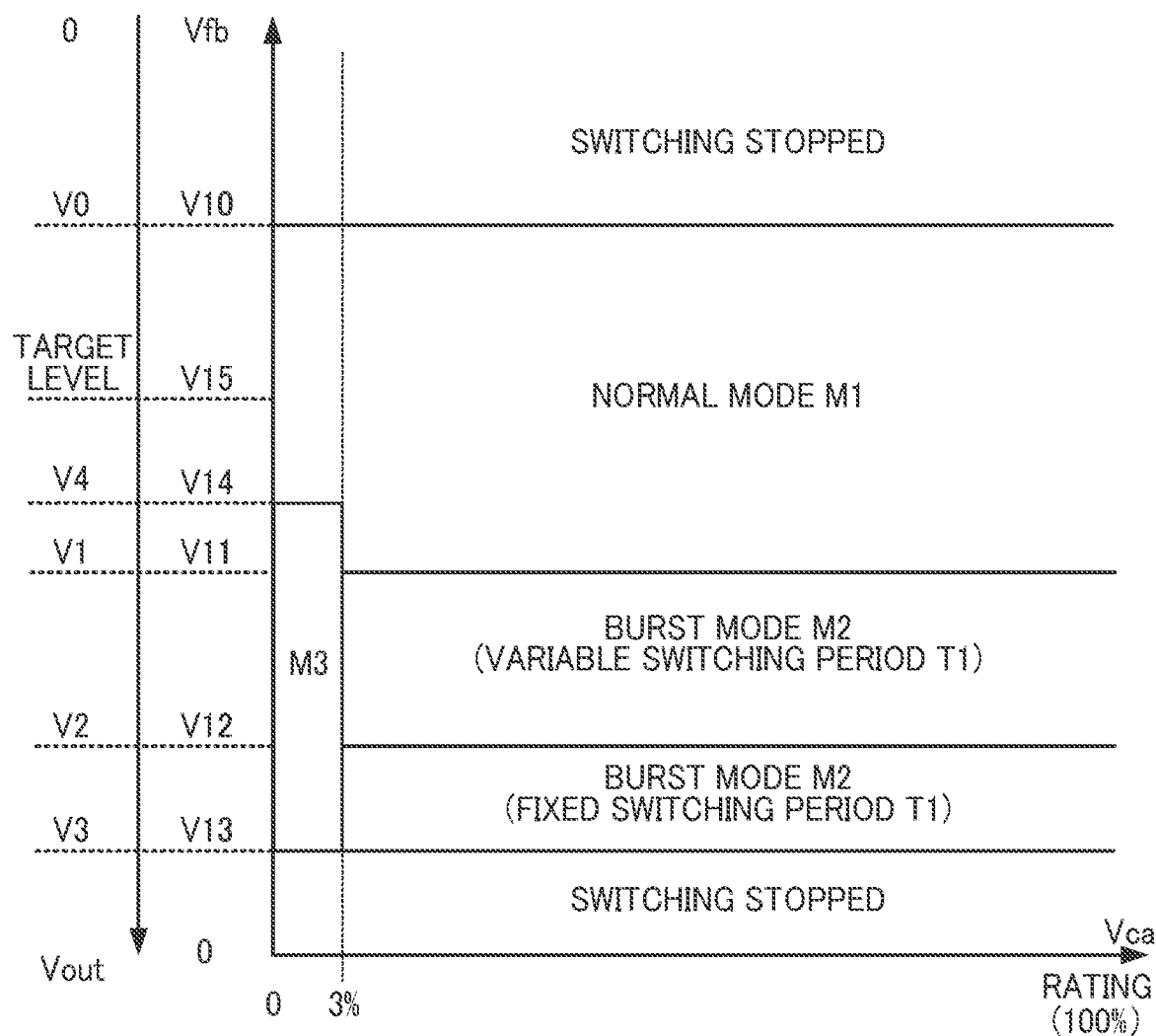
FIG. 6 is a chart for explaining operation modes of a digital control circuit 150.

FIG. 6 is a chart for explaining the operation of the digital control circuit 150. In FIG. 6, the horizontal axis represents the voltage Vca corresponding to the power consumption of the load 11, and the vertical axis represents the feedback voltage Vfb and the output voltage Vout. As described above, in an embodiment of the present disclosure, when the output voltage Vout rises, the feedback voltage Vfb drops. Accordingly, on the vertical axis of FIG. 6, the direction in which the level of the feedback voltage Vfb rises (upward in FIG. 6) is opposite to the direction in which the output voltage Vout rises (downward in FIG. 6).

In FIG. 6, voltages V0 to V4 on the axis of the output voltage Vout correspond to voltages V10 to V14 on the axis of the feedback voltage Vfb, respectively. That is, in response to the level of the output voltage Vout reaching the level of the voltage V0, the level of the feedback voltage Vfb reaches the level of the voltage V10. Note that the relationships between other voltages V1 to V4 and the voltages V11 to V14 are the same as the relationship between the voltages V0 and V10, and thus detailed description thereof is omitted here. Also, a target level of the output voltage Vout corresponds to the level of a voltage V15 of the feedback voltage Vfb.

First, here, a description is given of a case where the power consumption of the load 11 is greater than 3% when the rated power consumption of the load 11 (hereinafter referred to as "rated power" as appropriate) is 100%. In an embodiment of the present disclosure, a state in which the power consumption of the load 11 is equal to or less than 3% of the rated power is referred to as "the load 11 being in the light load condition". The digital control circuit 150 determines whether the power consumption of the load 11 is greater than 3%, based on the voltage Vca.

The level of the voltage V1 corresponds to a "first level", the level of the voltage V2 corresponds to a "second level", the level of the voltage V3 corresponds to a "third level", and the level of the voltage V4 corresponds to a "fourth level". Also, the "first value" corresponds to "3% of the rated power", the burst mode M2 corresponds to a "first burst mode", and the burst mode M3 corresponds to a "second burst mode".

===When Load 11 is Heavier Than Light Load Condition===
<<<When Level of Output Voltage Vout is Lower Than Voltage V0>>>

First, with reference to FIG. 6, a description is given of the digital control circuit 150 when the level of the output voltage Vout is lower than the level of the voltage V0. The voltage V0 is a voltage sufficiently lower than the target level (e.g., 12V) of the output voltage Vout. For example, when the input voltage Vin is lower than a predetermined level, the level of the output voltage Vout may become lower than the level of the voltage V0.

Such a state in which the level of the output voltage Vout is lower than the level of the voltage V0 may be, hereinafter, referred to as "the output voltage Vout being lower than the voltage V0" as appropriate. Further, as described above, in response to the level of the output voltage Vout reaching the voltage V0, the feedback voltage Vfb reaches the voltage V10.

When the output voltage Vout is lower than the voltage V0 and the feedback voltage Vfb is higher than the voltage V10, the digital control circuit 150 causes both the drive signals Vdr1 and Vdr2 to be low, to stop switching the NMOS transistors 31 and 32, based on the feedback voltage Vfb.

As such, in response to the output voltage Vout reaching the voltage V0 which is sufficiently lower than the target level, the DC-DC converter 10 stops switching the NMOS transistors 31 and 32 so that the DC-DC converter 10 does not become unstable.

Note that, for example, upon startup of the DC-DC converter 10, the output voltage Vout rises from zero. In such a case, the digital control circuit 150 is designed such that the output voltage Vout does not stop switching the NMOS transistors 31 and 32.

<<<When Output Voltage Vout is Higher Than Voltage V0 and Lower Than Voltage V1>>>

In response to the output voltage Vout exceeding the voltage V0, the digital control circuit 150 of FIG. 2 outputs drive signals Vdr1 and Vdr2 according to the normal mode M1, based on the feedback voltage Vfb, so that the output voltage Vout reaches the target level.

Figure 7:
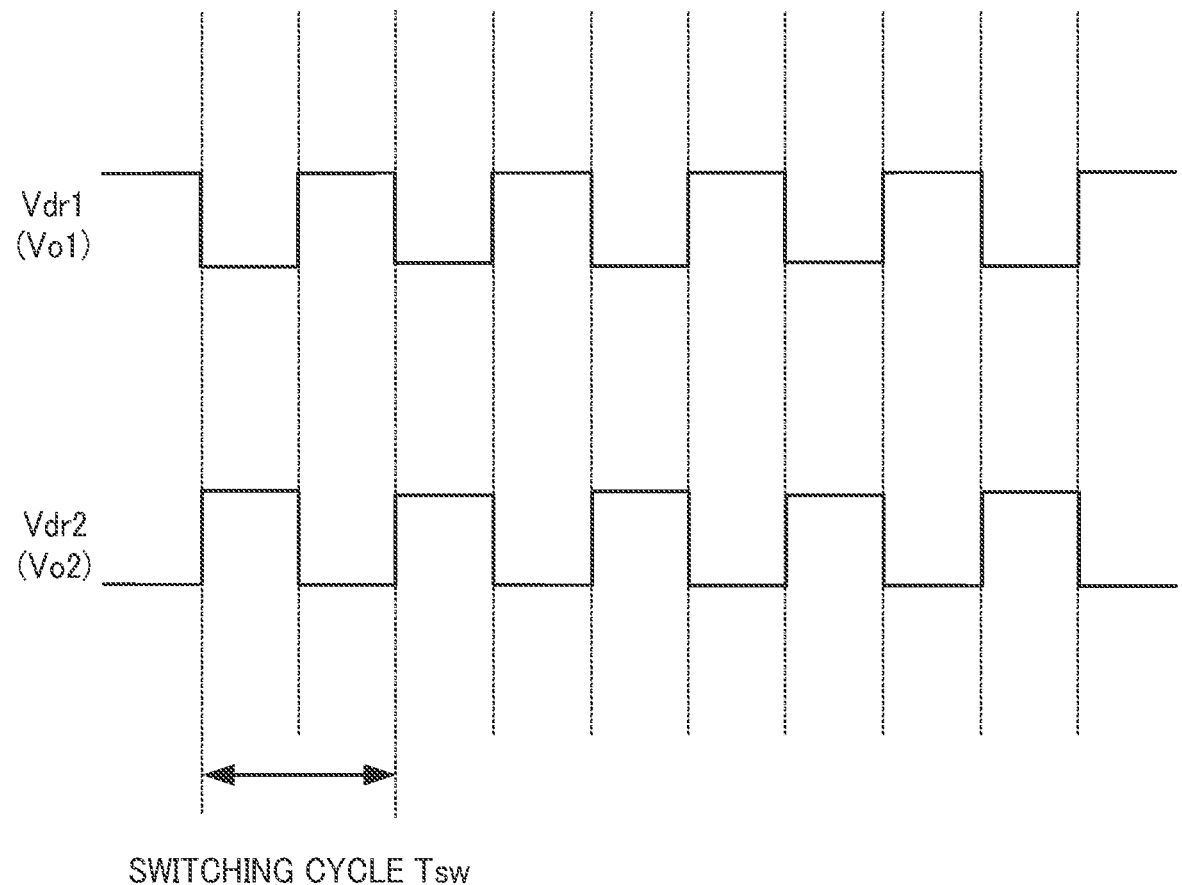
FIG. 7 is a chart illustrating an example of drive signals Vdr1 and Vdr2 in a normal mode M1.

FIG. 7 is a chart illustrating an overview of the drive signals Vdr1 and Vdr2 according to the normal mode M1. The digital control circuit 150 complementarily changes the drive signals Vdr1 and Vdr2 in the normal mode M1. To be more specific, the digital control circuit 150 changes the drive signal Vdr2 to low, in response to the drive signal Vdr1 going high, and changes the drive signal Vdr2 to high, in response to the drive signal Vdr1 going low.

In FIG. 7, a time period (so-called dead time) during which both the drive signals Vdr1 and Vdr2 are low is provided between the drive signals Vdr1 and Vdr2, however, it is omitted here, for convenience.

Figure 8:
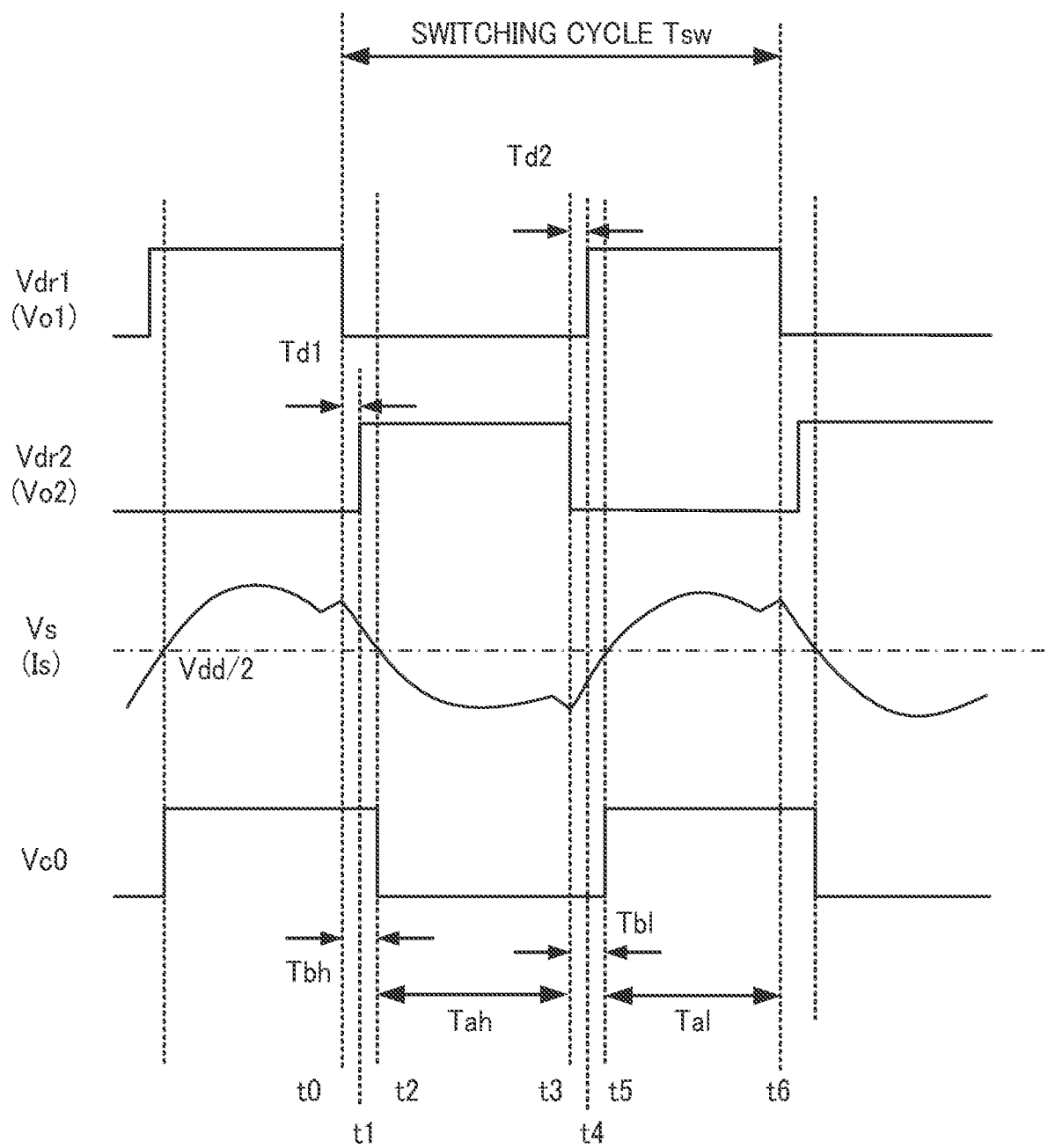
FIG. 8 is a chart for explaining a switching cycle Tsw of drive signals Vdr1 and Vdr2.

As illustrated in FIG. 5, the digital control circuit 150 according to an embodiment of the present disclosure determines a switching cycle Tsw of the drive signals Vdr1 and Vdr2, based on the feedback voltage Vfb and the timing at which the direction of the current Is changes (i.e., voltage Vc0). FIG. 8 is a chart for explaining details of the drive signals Vdr1 and Vdr2 in the normal mode M1.

At time t0, for example, the digital control circuit 150 changes the drive signal Vdr1 to low, and thus the high-side NMOS transistor 31 in FIG. 1 is turned off. Thereafter, at time t1 at which a time period Td1 corresponding to the dead time has elapsed, the digital control circuit 150 changes the drive signal Vdr2 to high. As a result, the low-side NMOS transistor 32 is turned on.

After the NMOS transistor 32 is turned on, the current Is gradually decreases and reaches zero at time t2. As a result, the comparator 122 in FIG. 2 outputs a low voltage Vc0 indicating that the current Is is flowing in the negative direction.

Then, the digital control circuit 150 calculates a time period Tah corresponding to the product of a time period Tbh from time t0 to time t2 and the feedback voltage Vfb, as expressed by Equation (2) as follows:

$$Tah = k \times Vfb \times Tbh \qquad (2),$$

where "k" is a predetermined constant.

At time t3 at which the time period Tah has elapsed since time t2, the digital control circuit 150 changes the drive signal Vdr2 to low, to turn off the NMOS transistor 32.

At time t4 at which a time period Td2 corresponding to the dead time has elapsed since time t3, the digital control circuit 150 changes the drive signal Vdr1 to high. As a result, the high-side NMOS transistor 31 in FIG. 1 is turned on.

After the NMOS transistor 31 is turned on, the current Is gradually increases, to reach zero at time t5. As a result, the comparator 122 in FIG. 2 outputs a high voltage Vc0 indicating that the current Is is flowing in the positive direction.

Then, the digital control circuit 150 calculates a time period Tal corresponding to the product of a time period Tbl from time t3 to time t5 and the feedback voltage Vfb, as expressed by Equation (3) as follows:

$$Tal = k \times Vfb \times Tbl \qquad (3),$$

where "k" is the foregoing predetermined constant.

At time t6 at which the time period Tal has elapsed since time t5, the digital control circuit 150 changes the drive signal Vdr1 to low. Further, from time t6, the operation from time t0 to time t6 is repeated. As such, the switching cycle Tsw according to an embodiment of the present disclosure is determined based on the time period Tah and the time period Tal. Accordingly, the switching cycle Tsw increases as the output voltage Vout drops and the feedback voltage Vfb rises.

Figure 9:
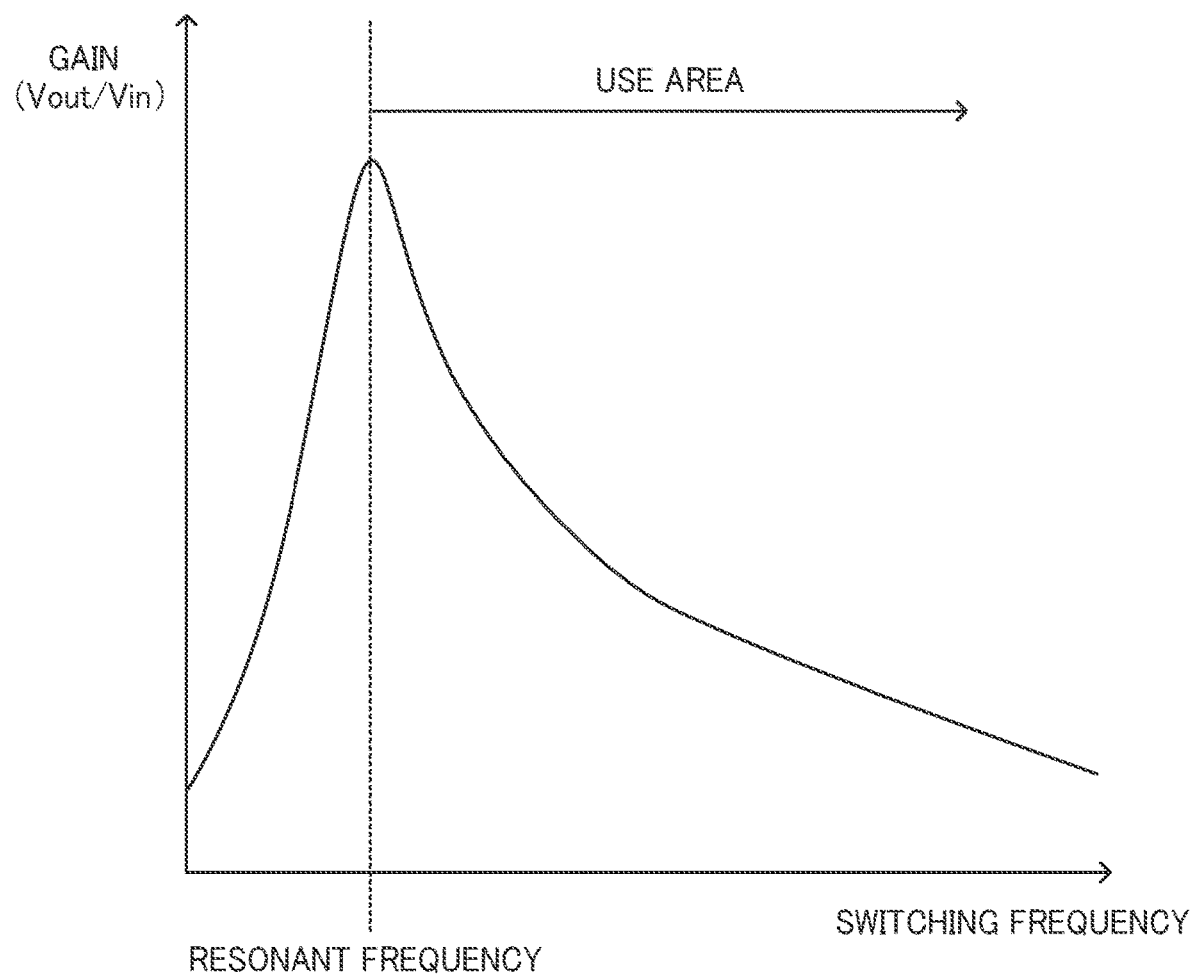
FIG. 9 is a chart for explaining a relationship between a gain of a DC-DC converter 10 and a switching frequency.

Such a relationship as illustrated in FIG. 9 is established between a gain (=Vout/Vin) of the LLC current resonant DC-DC converter 10 and the switching frequency of the NMOS transistors 31 and 32, for example. In an embodiment of the present disclosure, the switching frequency of the NMOS transistors 31 and 32 are designed to be higher than the resonant frequency of the resonant circuit including the primary coil L1 and the capacitor 34 in FIG. 1. In other words, in an embodiment of the present disclosure, the switching frequency of the NMOS transistors 31 and 32 is designed so as to change in a "use area" illustrated in FIG. 9.

If the output voltage Vout of the DC-DC converter 10 drops from the target level, the feedback voltage Vfb rises, and thus the switching cycle Tsw increases. In this case, the switching frequency of the NMOS transistors 31 and 32 decreases and the gain (=Vout/Vin) increases, resulting in a rise in the output voltage Vout.

Meanwhile, if the level of the output voltage Vout rises from the target level, the feedback voltage Vfb drops, and thus the switching cycle Tsw decreases. In this case, the switching frequency of the NMOS transistors 31 and 32 increases and the gain (=Vout/Vin) decreases, resulting in a drop in the output voltage Vout. Accordingly, the DC-DC converter 10 outputs the drive signals Vdr1 and Vdr2 according to the normal mode M1, thereby being able to generate the output voltage Vout at the target level.

<<<When Output Voltage Vout is Higher than Voltage V1>>>

As illustrated in FIG. 6, when the power consumption of the load 11 decreases and the output voltage Vout exceeds the voltage V1, for example, the digital control circuit 150 outputs drive signals Vdr1 and Vdr2 according to the burst mode M2. In an embodiment of the present disclosure, in response to the level of the output voltage Vout reaching the voltage V1, the feedback voltage Vfb reaches the voltage V11.

The "burst mode M2" according to an embodiment of the present disclosure is an operation mode in which the switching period T1 during which the NMOS transistors 31 and 32 are continuously switched and the stop period T2 during which switching of the NMOS transistors 31 and 32 is stopped are repeated in a predetermined cycle Tx.

Figure 10:
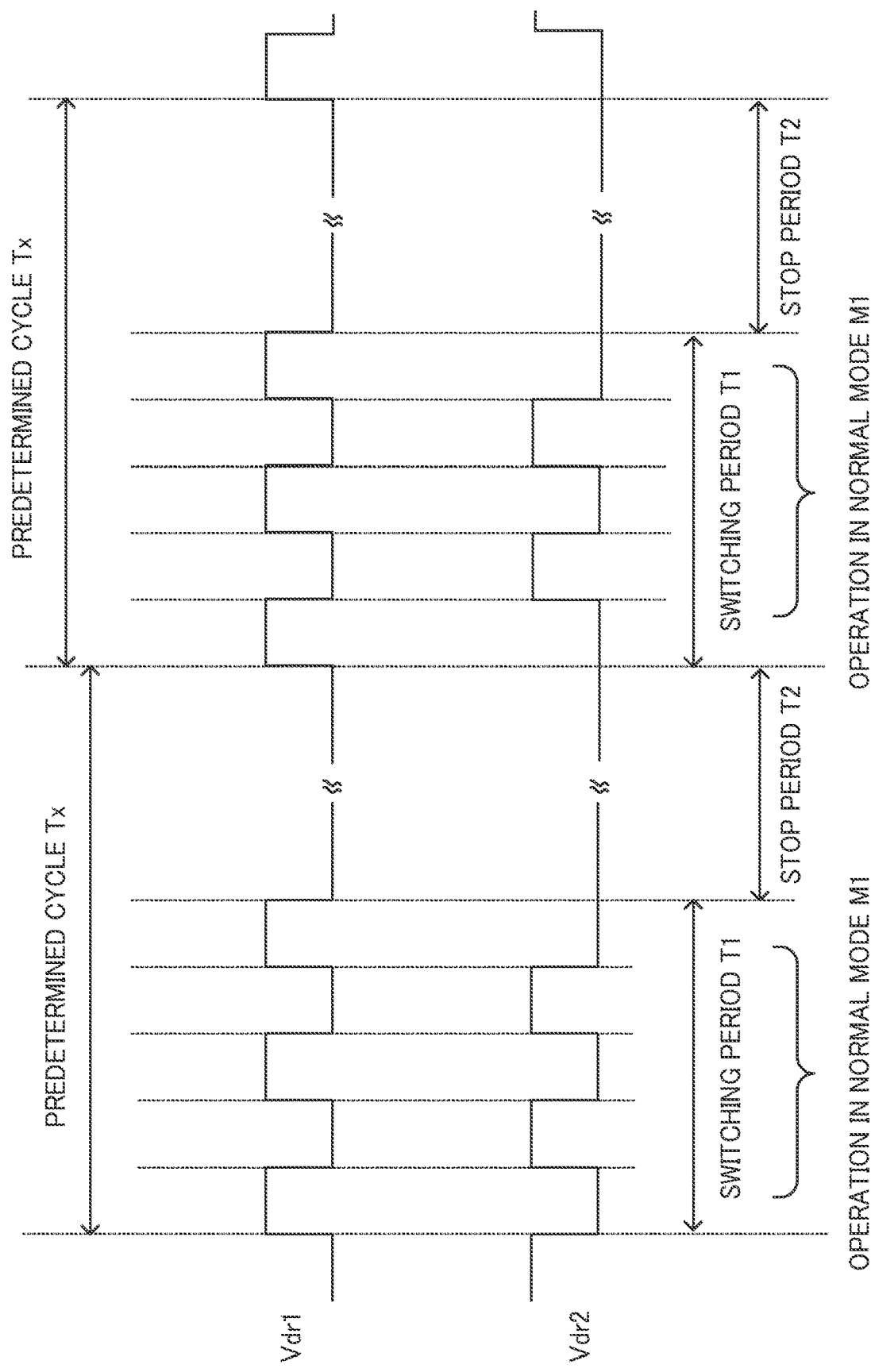
FIG. 10 is a chart for explaining a switching period T1 and a stop period T2 in a burst mode M2.

FIG. 10 is a chart illustrating an example of the drive signals Vdr1 and Vdr2 according to the burst mode M2. The digital control circuit 150 according to an embodiment of the present disclosure outputs the same drive signals Vdr1 and Vdr2 as in the normal mode M1 during the switching period T1 in the burst mode M2. To be more specific, as illustrated in FIGS. 5 and 8, the digital control circuit 150 acquires the feedback voltage Vfb and the timing at which the direction of the current Is changes (i.e., voltage Vc0). Then, the digital control circuit 150 outputs drive signals Vdr1 and Vdr2 having the switching cycle Tsw obtained using Equations (2) and (3).

Accordingly, in the DC-DC converter 10, even when the power consumption of the load 11 decreases and the operation mode of the digital control circuit 150 changes from the normal mode M1 to the burst mode M2, the switching method of the NMOS transistors 31 and 32 does not change. As a result, in an embodiment of the present disclosure, even when the operation mode of the digital control circuit 150 changes, an unstable operation of the DC-DC converter 10 can be prevented.

Here, the "switching method" is determined by the switching pattern of the NMOS transistors 31 and 32 and the switching cycle Tsw, for example. In an embodiment of the present disclosure, in each of the normal mode M1 and the burst mode M2, the NMOS transistors 31 and 32 have a switching pattern in which the NMOS transistors 31 and 32 are complementarily on and off if the dead time is ignored.

Furthermore, in each of the normal mode M1 and the burst mode M2, the switching cycle Tsw is determined based on the same Equations (2) and (3), for example. Accordingly, in an embodiment of the present disclosure, the switching method in the normal mode M1 and the switching method in the burst mode M2 are the same. The switching cycle Tsw in the normal mode M1 and the switching cycle Tsw in the burst mode M2 each correspond to a "first cycle", and the switching cycle Tsw in the burst mode M3 corresponds to a "second cycle".

Figure 11A:
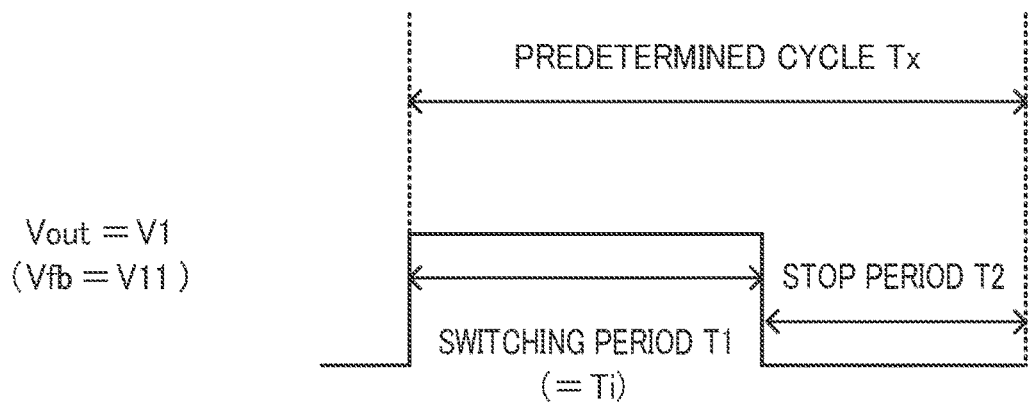
FIGS. 11A to 11C are charts for explaining changes in a switching period T1 in a burst mode M2.
Figure 11B:
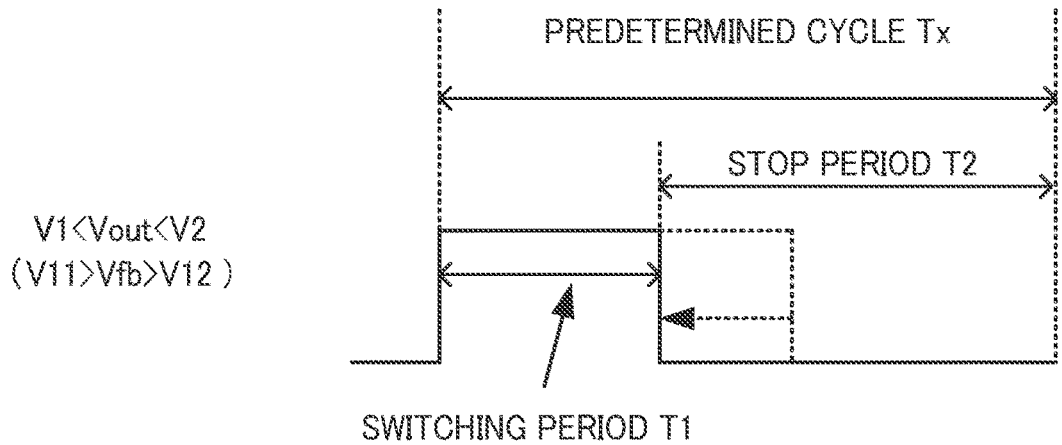
Figure 11C:
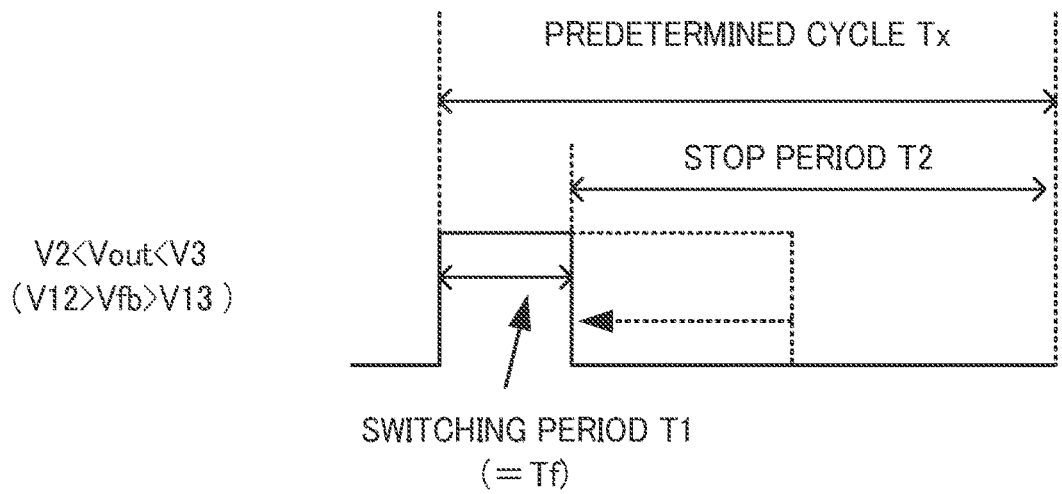

FIGS. 11A to 11C are charts for explaining waveforms in the burst mode M2 when the output voltage Vout changes. FIG. 11A is an example of a waveform in the burst mode M2 when the output voltage Vout is the voltage V1 (i.e., the feedback voltage Vfb is the voltage V11). In this case, the digital control circuit 150 sets the switching period T1 to a time period Ti (e.g., 6 ms), which is an initial value, in a predetermined cycle Tx (e.g., 10 ms), and sets the stop period T2 to a time period (e.g., 4 ms) obtained by subtracting the time period Ti from the predetermined cycle Tx. That is, in an embodiment of the present disclosure, the stop period T2 results in Tx−T1 (=Tx−Ti).

For example, when the power consumption of the load 11 decreases and the output voltage Vout rises from the voltage V1 (i.e., when the feedback voltage Vfb drops from the voltage V11), the digital control circuit 150 gradually reduces the switching period T1 from the time period Ti (see FIG. 11B).

In an embodiment of the present disclosure, in the burst mode M2, the cycle determined by the switching period T1 and the stop period T2 is the predetermined cycle Tx, and thus is constant. Accordingly, in response to the switching period T1 decreases, the power transmitted from the primary side to the secondary side in the DC-DC converter 10 also decreases. As a result, a rise in the output voltage Vout can be suppressed.

If the power consumption of the load 11 further decreases and the output voltage Vout reaches the voltage V2 (i.e., if the feedback voltage Vfb drops to the voltage V12), the digital control circuit 150 stops gradually reducing the switching period T1 as illustrated in FIGS. 6 and 11C, for example. To be more specific, when the output voltage Vout is in a range of from the voltage V2 to the voltage V3 (i.e., when the feedback voltage Vfb is in a range of from the voltage V12 to the voltage V13), the digital control circuit 150 maintains a time period Tf, which is the switching period T1 when the feedback voltage Vfb is the voltage V12, as the switching period T1. Note that the time period Tf, which is the switching period T1 in the predetermined cycle Tx (e.g., 10 ms), is 2 ms, for example, and thus the stop period T2 is 8 ms.

As such, in an embodiment of the present disclosure, in response to the output voltage Vout exceeding the voltage V2, the switching period T1 is fixed to the time period Tf in the burst mode M2. If the switching period T1 reaches zero and the switching of the NMOS transistors 31 and 32 is stopped for a long period of time, each coil of the transformer 33 and a parasitic capacitance and the like of the NMOS transistor 31, 32, for example, may be discharged. In such a case, when the DC-DC converter 10 restarts the switching operation, unwanted noise may be generated and the operation of the DC-DC converter may become unstable.

In the DC-DC converter 10 according to an embodiment of the present disclosure, even when the output voltage Vout exceeds the voltage V2, the switching period T1 does not reach zero, and thus, the operation of the DC-DC converter 10 can be stabilized while noise generation is suppressed.

The switching period T1 corresponds to a "first time period", the stop period T2 corresponds to a "second time period", and the time period Tf corresponds to a "predetermined time period". Note that the time period Tf is the switching period T1 when the level of the output voltage Vout reaches the level of the voltage V2.

<<<When Output Voltage Vout is Higher than Voltage V3>>>

In response to the power consumption of the load 11 decreasing and the output voltage Vout exceeding the voltage V3 (i.e., in response to the feedback voltage Vfb dropping to the voltage V13), the digital control circuit 150 outputs low drive signals Vdr1 and Vdr2 to stop switching the NMOS transistors 31 and 32, as illustrated in FIG. 6, for example.

===When Load 11 is in Light Load Condition===

Next, a description is given of a case where the load 11 is in the light load condition, in other words, the power consumption of the load 11 is equal to or less than 3% in FIG. 6. The digital control circuit 150 determines that the power consumption of the load 11 is equal to or less than 3%, based on the voltage Vca.

First, when a predetermined condition is satisfied in the state where the load 11 is in the light load condition, the digital control circuit 150 outputs low drive signals Vdr1 and Vdr2 so as to stop switching the NMOS transistors 31 and 32.

Here, "when the predetermined condition is satisfied" means "when the output voltage Vout is higher than the voltage V3 (i.e., when the feedback voltage Vfb is lower than the voltage V13)" and "when the output voltage Vout is lower than the voltage V0 (i.e., when the feedback voltage Vfb is higher than the voltage V10)".

When the output voltage Vout is higher than the voltage V0 and lower than the voltage V4 (i.e., when the feedback voltage Vfb is lower than the voltage V10 and higher than the voltage V14) in a state where the load 11 is in the light load condition, the digital control circuit 150 outputs drive signals Vdr1 and Vdr2 according to the foregoing normal mode M1.

The level of the voltage V4 in an embodiment of the present disclosure is higher than the target level of the output voltage Vout and lower than the level of the voltage V1 at which the burst mode M2 is started. As a result, even when the load 11 is in the light load condition, the DC-DC converter 10 operates in the normal mode M1 unless the output voltage Vout reaches a relatively high voltage V4 (<V1).

Meanwhile, when the output voltage Vout is higher than the voltage V4 and lower than the voltage V3 (i.e., when the feedback voltage Vfb is lower than the voltage V14 and higher than the voltage V13) in the state where the load 11 is in the light load condition, the digital control circuit 150 outputs drive signals Vdr1 and Vdr2 according to the burst mode M3. Here, the burst mode M3 is an operation mode in which the switching period T1 during which the NMOS transistors 31 and 32 are continuously switched and the stop period T2 during which the switching of the NMOS transistors 31 and 32 is stopped are repeated.

In the burst mode M3, unlike the burst mode M2, the switching cycle Tsw is determined based on the voltage Vw and the input voltage Vin, as illustrated in FIG. 5. To be more specific, the digital control circuit 150 in FIG. 2 outputs drive signals Vdr1 and Vdr2, based on the result of detection (voltages Vc1 and Vc2) of the detection circuit 140 illustrated in FIG. 3, in the burst mode M3. As a result, as described with reference to FIG. 4, the digital control circuit 150 outputs a high drive signal Vdr1, in response to the voltage Vc1 going high, and outputs a high drive signal Vdr2, in response to the voltage Vc2 going high.

Figure 12:
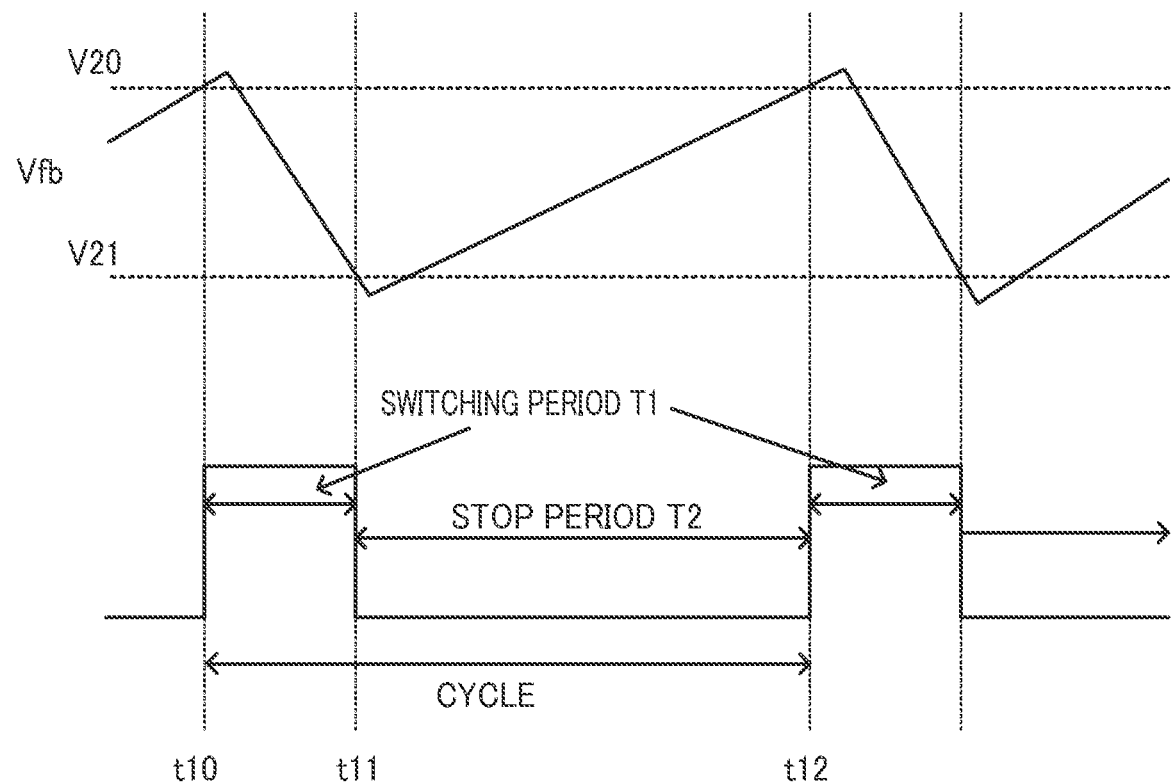
FIG. 12 is a chart for explaining a switching period T1 and a stop period T2 in a burst mode M3.

Further, as illustrated in FIG. 5, the digital control circuit 150 also determines the switching period T1 based on the feedback voltage Vfb when operating in the burst mode M3. FIG. 12 is a chart for explaining the switching period T1 and the stop period T2 when the digital control circuit 150 operates in the burst mode M3.

For example, at time t10 at which the feedback voltage Vfb rises to a voltage V20 at a predetermined level, the digital control circuit 150 generates drive signals Vdr1 and Vdr2 according to the burst mode M3. As a result, the NMOS transistors 31 and 32 are switched.

In response to the NMOS transistors 31 and 32 being driven at time t10, the output voltage Vout rises, and thus the feedback voltage Vfb drops slightly after time t10. Then, at time t11 at which the feedback voltage Vfb drops to a voltage V21 at a predetermined level, for example, the generation of the drive signals Vdr1 and Vdr2 is stopped. Note that a time period from time t10 to time t11 is the "switching period T1".

As a result, the switching of the NMOS transistors 31 and 32 is also stopped, and thus the output voltage Vout drops. When the feedback voltage Vfb rises slightly after time t11 and reaches the voltage V20 at time t12, for example, the drive signals Vdr1 and Vdr2 according to the burst mode M3 are generated. As a result, the NMOS transistors 31 and 32 are driven again at this timing. Note that a time period from time t11 to time t12 is the "stop period T2".

From time t12, the operation from time t10 to time 12 is repeated. As such, the digital control circuit 150 operates in the burst mode M3, during the switching period T1 according to the feedback voltage Vfb. Accordingly, in an embodiment of the present disclosure, it is possible to suppress a rise in the output voltage Vout in the state where the load 11 is in the light load condition, while suppressing the power consumption of the DC-DC converter 10. Note that the voltage V20 is a predetermined voltage that is close to the voltage V14 and lower than the voltage V14. The voltage V21 is a predetermined voltage that is close to the voltage V13 and higher than the voltage V14.

Example of Operation Mode when Power Consumption of Load 11 Decreases

Figure 13:
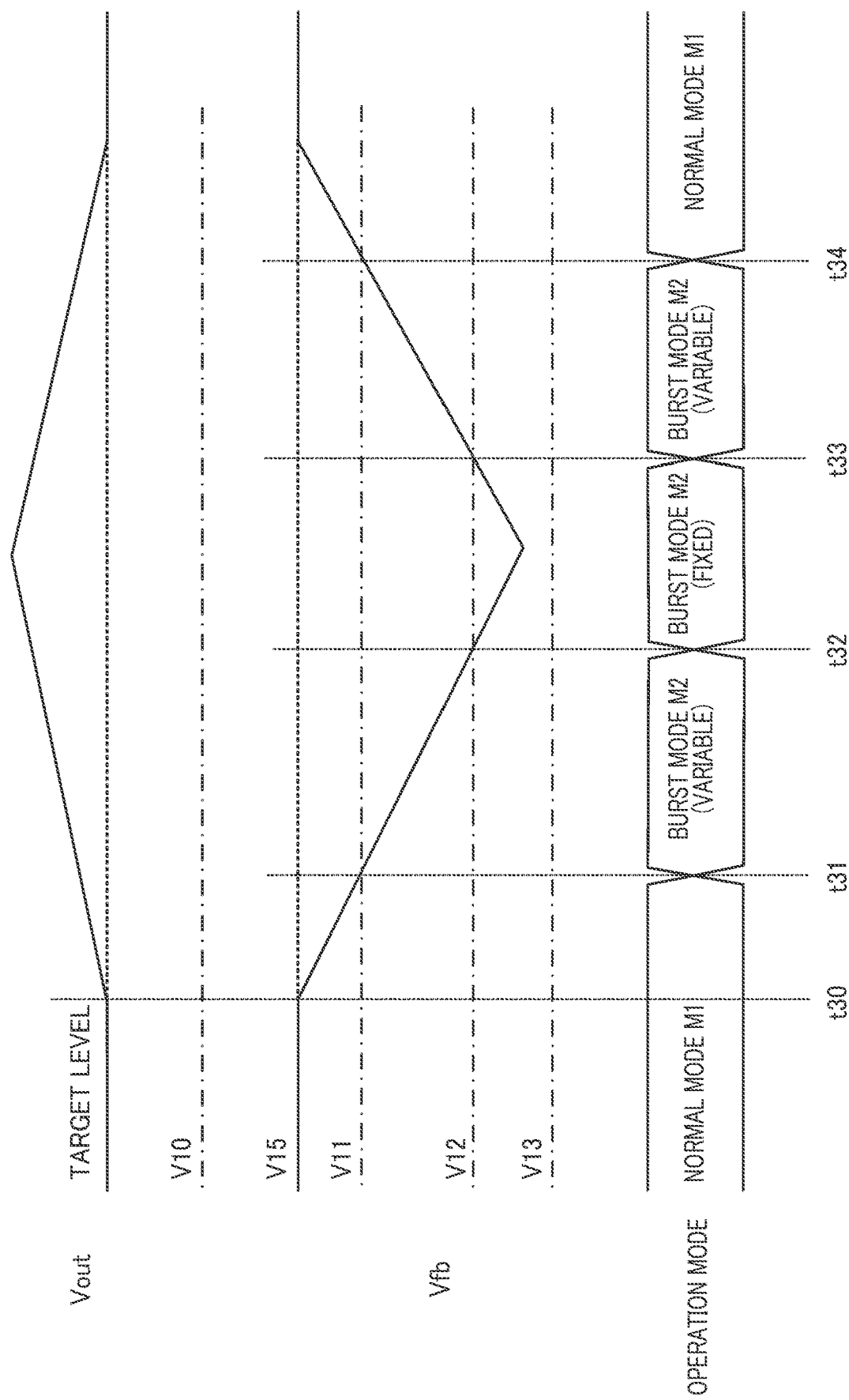
FIG. 13 is a chart illustrating an example of changes in operation mode of a DC-DC converter 10.

FIG. 13 is a chart illustrating an example of the operation mode of the digital control circuit 150 when the power consumption of the load 11 decreases. Here, it is assumed that before time t30, the DC-DC converter 10 operates in the normal mode M1 and generates an output voltage Vout at the target level.

At time t30, upon reduction in the power consumption of the load 11, the output voltage Vout rises above the target level. Here, it is assumed that the load 11 is under a load condition heavier than in the light load condition (i.e., 3% of the rating). Upon rise in the output voltage Vout, the feedback voltage Vfb drops from the voltage V15 corresponding to the target level.

Then, in response to the feedback voltage Vfb reaching the voltage V11 at time t31, the operation mode of the digital control circuit 150 changes from the normal mode M1 to the burst mode M2. As a result, as illustrated in FIG. 11A, the switching period T1 and the stop period T2 are repeated in the predetermined cycle Tx.

Since the feedback voltage Vfb gradually drops from time t31, the digital control circuit 150 gradually reduces the switching period T1 in the predetermined cycle Tx, as illustrated in FIG. 11B. As a result, the power transmitted from the primary side to the secondary side in the DC-DC converter 10 is reduced, and thus a rise in the output voltage Vout is suppressed, for example.

In response to the feedback voltage Vfb reaching the voltage V12 at time t32, the digital control circuit 150 sets the switching period T1 to a minimum time period Tf in the predetermined cycle Tx, as illustrated in FIG. 11C. As a result, even when the feedback voltage Vfb drops from the voltage V12 from time t32, the switching period T1 does not decrease.

Thereafter, upon drop in the output voltage Vout, the feedback voltage Vfb rises and reaches the voltage V12 at time t33. As a result, from time t33, the digital control circuit 150 increases the switching period T1 according to a rise in the feedback voltage Vfb. Then, in response to the feedback voltage Vfb reaching the voltage V11 at time t34, the operation mode of the digital control circuit 150 changes from the burst mode M2 to the normal mode M1.

As described above, when the output voltage Vout is higher than the target level in the normal mode M1, the digital control circuit 150 outputs the drive signals Vdr1 and Vdr2 for causing the output voltage Vout to reach the target level. As a result, the output voltage Vout of the DC-DC converter 10 reaches the target level.

SUMMARY

The DC-DC converter 10 according to an embodiment of the present disclosure has been described above. The digital control circuit 150 of the control IC 50 outputs the drive signals Vdr1 and Vdr2 according to the normal mode M1 when the output voltage Vout is lower than the voltage V1, and outputs the drive signals Vdr1 and Vdr2 according to the burst mode M2 when the output voltage Vout is higher than the voltage V1 (see FIG. 6). Then, as illustrated in FIG. 5, for example, in each of the normal mode M1 and the burst mode M2, the switching cycle Tsw of the drive signals Vdr1 and Vdr2 is generated by the same method. Then, as the output voltage Vout rises above the voltage V1, the digital control circuit 150 reduces the switching period T1 as illustrated in FIG. 11B, for example. Accordingly, in an embodiment of the present disclosure, even when the condition of the load 11 changes and the operation mode of the DC-DC converter 10 changes, the DC-DC converter 10 can be stably operated.

Further, in response to the output voltage Vout reaching the voltage V2 higher than the voltage V1, the digital control circuit 150 stops reducing the switching period T1 as illustrated in FIG. 11C, for example. Accordingly, even when the output voltage Vout exceeding the voltage V2, the digital control circuit 150 fixes the switching period T1 in the burst mode M2 to the time period Tf. As a result, in an embodiment of the present disclosure, it is possible to prevent switching of the NMOS transistors 31 and 32 from being stopped while suppressing a rise in the output voltage Vout.

The digital control circuit 150 outputs low drive signals Vdr1 and Vdr2 to stop switching the NMOS transistors 31 and 32, in response to the output voltage Vout reaching the voltage V3. As a result, the output voltage Vout can be prevented from rising abnormally.

The digital control circuit 150 may output the drive signals Vdr1 and Vdr2 according to the burst mode M2 different from the burst mode M1, in response to the load 11 entering the light load condition, for example. Such a case uses burst modes that are different depending on whether the load 11 is in the light load condition or not, and thus the DC-DC converter 10 can select the optimum burst mode according to the condition of the load 11.

The digital control circuit 150 operates in the burst mode M2, in response to the load 11 entering the light load condition and the output voltage Vout exceeding the voltage V4. Accordingly, even in a state where the load 11 is in the light load condition, the digital control circuit 150 operates in the normal mode M1 when the output voltage Vout is low. This can prevent unnecessary switching of the operation mode.

The digital control circuit 150 operates in the burst mode M2, in response to the power consumption of the load 11 being equal to or less than 5% (here, e.g., 3%) of the rated power. In an embodiment of the present disclosure, it is possible to set conditions for using the burst mode M2 different from the burst mode M1, particularly in the state where the load 11 is in the light load condition. Thus, it is possible to particularly improve the conversion efficiency of the DC-DC converter 10 under the light load condition.

The digital control circuit 150 determines the switching cycle Tsw, based on the voltage Vw at the terminal VW, when operating in the burst mode M2.

The digital control circuit 150 determines the switching cycle Tsw, based on the voltage Vw and the input voltage Vin, when operating in the burst mode M2. For example, when the input voltage Vin of the DC-DC converter 10 rises, the voltages generated at the primary coil and the auxiliary coil L4 also rise, and the power transmitted to the secondary side also increases. Accordingly, in an embodiment of the present disclosure, power can be appropriately transmitted to the secondary side in accordance with the level of the input voltage Vin, in the burst mode M2.

The present disclosure is directed to provision of a switching control circuit capable of stably operating a power supply circuit when a load condition changes.

According to the present disclosure, it is possible to provide a switching control circuit capable of stably operating a power supply circuit when a load condition changes.

Embodiment(s) of the present disclosure described above is/are simply to facilitate understanding of the present disclosure and is/are not in any way to be construed as limiting the present disclosure. The present disclosure may variously be changed or altered without departing from its essential features and encompass equivalents thereof.

What is claimed is:

1. A switching control circuit for a power supply circuit that includes
   a transformer including a primary coil and a secondary coil, and
   first and second transistors configured to control a current flowing through the primary coil,
the power supply circuit being configured to generate an output voltage at a target level, the switching control circuit configured to control switching of the first and second transistors, the switching control circuit comprising:
   a drive signal output circuit configured to
   output drive signals according to a normal mode, when the output voltage is lower than a first level, and
   output the drive signals according to a first burst mode, when the output voltage is higher than the first level; and a driver circuit configured to switch the first and second transistors in response to the drive signals, wherein the normal mode is a mode in which the first and second transistors are continuously switched, in a first cycle based on a feedback voltage corresponding to the output voltage, the first burst mode is a mode in which a first time period, during which the first and second transistors are continuously switched in the first cycle, and a second time period, during which the switching of the first and second transistors is stopped, are repeated in a predetermined cycle, and the drive signal output circuit reduces the first time period in the predetermined cycle, in response to the output voltage rising above the first level.

2. The switching control circuit according to claim 1, wherein the drive signal output circuit sets the first time period to a predetermined time period, in response to the output voltage reaching a second level higher than the first level.

3. The switching control circuit according to claim 2, wherein the drive signal output circuit outputs the drive signals to stop the switching of the first and second transistors, in response to the output voltage reaching a third level higher than the second level.

4. The switching control circuit according to claim 1, wherein the power supply circuit further includes a first capacitor coupled in series with the primary coil, and drives a load;

the switching control circuit further includes a load detection circuit configured to detect a condition of the load of the power supply circuit, based on a resonant current of a resonant circuit that is formed by the primary coil and the first capacitor; and the drive signal output circuit outputs the drive signals according to a second burst mode different from the first burst mode, in response to power consumed by the load becoming smaller than a first value.

5. The switching control circuit according to claim 4, wherein the drive signal output circuit outputs the drive signals according to the second burst mode, in response to the power consumed by the load becoming smaller than the first value and the output voltage exceeding another level lower than the first level.

6. The switching control circuit according to claim 4, wherein the load has a rated power; and the first value is equal to or less than 5% of the rated power of the load.

7. The switching control circuit according to claim 4, wherein the transformer includes an auxiliary coil, the switching control circuit is an integrated circuit having a first terminal configured to receive a voltage corresponding to a voltage at the auxiliary coil, and the drive signals outputted by the drive signal output circuit according to the second burst mode have a second cycle based on the voltage at the first terminal.

8. The switching control circuit according to claim 7, further comprising:

a second terminal configured to receive an input voltage of the power supply circuit, wherein the second cycle of the outputted drive signals is based on both the voltage at the first terminal and a voltage at the second terminal.

9. A power supply circuit configured to generate an output voltage at a target level, the power supply circuit comprising:

a transformer including a primary coil and a secondary coil;

first and second transistors configured to control a current flowing through the primary coil; and a switching control circuit configured to control switching of the first and second transistors, wherein the switching control circuit includes:

a drive signal output circuit configured to output drive signals according to a normal mode, when the output voltage is lower than a first level, and output the drive signals according to a first burst mode, when the output voltage is higher than the first level, and a driver circuit configured to switch the first and second transistors, in response to the drive signals, wherein the normal mode is a mode in which the first and second transistors are continuously switched, in a first cycle based on a feedback voltage corresponding to the output voltage, and the first burst mode is a mode in which a first time period, during which the first and second transistors are continuously switched in the first cycle, and a second time period, during which the switching of the first and second transistors is stopped, are repeated in a predetermined cycle; and the drive signal output circuit reduces the first time period in the predetermined cycle, in response to the output voltage rising above the first level.

* * * * *